United States Patent [19]
Lenkman

[11] Patent Number: 5,845,914
[45] Date of Patent: Dec. 8, 1998

[54] PORTABLE SUSPENSION SYSTEM FOR HIGHLY SENSITIVE EQUIPMENT

[75] Inventor: Thomas E. Lenkman, St. Charles, Mo.

[73] Assignee: Laser Vision Centers, Inc., St. Louis, Mo.

[21] Appl. No.: 743,381

[22] Filed: Nov. 4, 1996

[51] Int. Cl.$^6$ .................................................. B62B 3/02
[52] U.S. Cl. .................. 280/43.17; 280/43.23; 280/43.24; 280/47.34; 410/66; 410/80; 410/84
[58] Field of Search ............... 280/43.17, 43.18, 280/43.22, 43.23, 43.24, 47.34, 47.35, 47.41; 296/24.1; 410/66, 77, 80, 81, 84

[56] References Cited

U.S. PATENT DOCUMENTS

| | | | |
|---|---|---|---|
| 1,804,542 | 5/1931 | Perin | 410/80 |
| 2,033,119 | 3/1936 | Bennett | 410/80 |
| 2,503,368 | 4/1950 | Willetts | 410/77 |
| 3,104,622 | 9/1963 | Zijp et al. | 280/711 |
| 3,667,635 | 6/1972 | Hackney | 296/24 |
| 3,734,442 | 5/1973 | Lunde | 410/77 |
| 3,861,706 | 1/1975 | Gouirand | 280/711 |
| 4,883,282 | 11/1989 | Wolf et al. | 280/43.24 |
| 4,940,110 | 7/1990 | Svensson et al. | 280/43.24 |
| 5,035,439 | 7/1991 | Petrillo | 280/43.23 |
| 5,195,764 | 3/1993 | Schantz et al. | 280/43.23 |
| 5,398,986 | 3/1995 | Koob | 296/24.1 |
| 5,423,651 | 6/1995 | Dinverno | 280/47.35 |
| 5,429,378 | 7/1995 | Durel-Crain | 280/43.22 |
| 5,535,465 | 7/1996 | Hannant | 280/43.23 |
| 5,613,697 | 3/1997 | Johnson | 280/43.23 |
| 5,628,522 | 5/1997 | Hall | 280/43.17 |

FOREIGN PATENT DOCUMENTS

| | | | |
|---|---|---|---|
| 1302298 | 7/1962 | France | 280/43.23 |
| 403189246 | 8/1991 | Japan | 410/84 |
| 177211 | 8/1935 | Switzerland | 280/43.22 |

*Primary Examiner*—Brian L. Johnson
*Assistant Examiner*—Min Yu
*Attorney, Agent, or Firm*—Polster, Lieder, Woodruff & Lucchesi

[57] ABSTRACT

A portable cart for transporting highly sensitive equipment such as an excimer laser is disclosed. The portable cart includes a first frame support including spaced feet for supporting the equipment on a floor surface. A second frame support includes rollers for rolling movement of the equipment. The first frame support is vertically movable relative to the second frame support. Expandable/retractable shock absorbing element are positioned between the first and second frame supports. The shock absorbing elements when expanded lift the first frame support including the spaced feet above a floor surface while rollers of the second frame support to engage a floor surface for rolling shock absorbing movement of the equipment. The expandable/retractable shock absorbing elements when retracted lower the first frame support to cause the spaced feet to engage a floor surface for fixed support of the highly sensitive equipment on a floor surface. In order to transport the portable cart in a truck van, the truck van includes floor supports on a truck van floor surface for corresponding engagement with extensive/retractable arms associated with the portable cart. Preferably, the floor supports on the truck van floor surface provide a three point engagement with the extensive/retractable arms of the portable cart.

12 Claims, 11 Drawing Sheets

FIG. 13 ations.

PORTABLE SUSPENSION SYSTEM FOR HIGHLY SENSITIVE EQUIPMENT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a portable cart for transporting highly sensitive equipment, such as an excimer laser, including the ability to secure the portable cart in a truck van for transport to various locations and subsequent removal of the portable cart with the highly sensitive equipment for movement to a doctor's office or clinic to permit use and operation of the equipment as desired.

Recently, excimer lasers have received FDA approval to perform photorefractive keratectomy (PRK) procedures for reshaping the cornea of a patient in order to adjust the cornea refractive power, which, in turn, eliminates or reduces the need for corrective lenses. Excimer lasers can be used for other eye procedures such as pathological superficial corneal disorders and laser in situ keratomileusis.

Due to the size and highly sensitive nature of excimer lasers, fixed-site centers where excimer lasers are permanently located are typically employed in large metropolitan areas. Of course, this limits the use of the excimer lasers to large segments of users in outlining geographical areas.

As a result, a self-contained mobile refractive laser surgery center as shown in U.S. Pat. No. 5,398,986 was developed. This mobile laser surgical center duplicates all of the equipment and services typically found in a fixed-site location. For this purpose, the mobile laser surgical center includes a truck body in which the surgical center is housed and a truck cab which transports the surgical center from one location to another. The excimer laser is secured to the floor of the truck body such that substantially no realignment of the excimer laser is needed when the surgical center is transported between locations. The truck body is also stabilized so that the truck floor will be maintained in a level condition during a surgical procedure. This mobile excimer laser surgical center has become very useful in extending the use of the excimer lasers to individuals in outlying areas. However, it has been discovered that this system can not only be quite expensive, it may not provide the desired flexibility in extending the use of the excimer laser to outlying and even remote geographical locations.

Accordingly, it has been discovered that it is possible to use a uniquely designed portable cart for transporting the highly sensitive excimer laser in a smaller truck van where the excimer laser is adequately secured in a fixed position and then subsequently removed from the truck van using the portable cart suspension system to protect the laser until it is moved to a doctor's office or clinic for subsequent operation and use of the excimer laser. During its securement in the truck van, the excimer laser is supported by the air cushion suspension system of the truck van. When removed from the truck van, the portable cart has its own air cushion air suspension system to enable the excimer laser to be moved to the desired location where the air cushion suspension system is deactivated for fixed positioning in a doctor's office or clinic. As will be appreciated, a portable cart constructed in the aforementioned manner enhances the use and operation of the excimer laser in outlying and even remote geographical locations due to the ability to readily move the excimer laser as described above with greater flexibility and with reduced cost.

BRIEF SUMMARY OF THE INVENTION

Among the several objects and advantages of the present invention include:

The provision of a new and improved portable cart for highly sensitive equipment such as excimer lasers;

The provision of the aforementioned portable cart which includes its own suspension system for readily moving the highly sensitive equipment without concern for malfunction or additional time to readjust the equipment when it reaches its desired location;

The provision of the aforementioned portable cart which is constructed for utilizing expandable/retractable shock absorbing elements positioned between first and second frame supports in the portable cart to provide shock absorbing rolling movement of the equipment until it reaches its desired location where the shock absorbing elements are retracted in order to enable the portable cart to be fixedly supported on a floor surface;

The provision of the aforementioned portable art in which the expandable/retractable shock absorbing elements comprise an air cushion suspension system;

The provision of the aforementioned portable cart in which the frame of the portable cart includes extensible/retractable arms for corresponding engagement with floor supports provided on a truck van floor surface in order to fixedly mount the portable cart in the truck van for transporting same;

The provision of the aforementioned portable cart in which the extensible/retractable arms engage the corresponding floor supports in the truck van floor surface in a three point engagement;

The provision of the aforementioned portable cart which is readily secured in a truck van in order to enable the air cushion suspension system of the truck van to protect the highly sensitive equipment during transportation, while enabling the portable cart to use its own air cushion suspension system during movement of the highly sensitive electrical equipment from the truck van to a doctor's office or clinic where it is located in a fixed position;

The provision of the aforementioned portable cart which enables the highly sensitive equipment to be moved to outlining and even remote geographical locations due to the enhanced flexibility and lower cost of the above described system; and The provision of the portable cart which is simple in construction and operation, durable in use and maintenance; provides an inexpensive alternative for moving highly sensitive equipment; readily protects the highly sensitive equipment during movement; and is otherwise well adapted for the purposes intended.

Briefly stated, the present invention discloses a portable cart for transporting highly sensitive equipment including a first frame support having spaced feet for supporting the equipment on the floor surface. The first frame support is vertically movable relative to a second frame support that includes rollers for rolling movement of the equipment. Expandable/retractable shock absorbing elements are positioned between the first and second frame supports. The shock absorbing elements when expanded lift the first frame support including spaced feet above a floor surface while enabling rollers of the second frame support to engage a floor surface for rolling shock absorbing movement of the equipment. The shock absorbing elements when retracted lower the first frame support to cause the spaced feet to engage a floor surface for fixed support of the equipment on a floor surface.

The first and second frame supports include complementary male and female elements for vertical movement of the second frame support relative to the first frame support. The first frame support includes shaft sections slidably received within corresponding openings provided in the second frame support.

User control means are provided for activating/deactivating the expandable/retractable shock absorbing elements. The user control means includes a user switch that energizes motor means to activate/de-activate the expandable/retractable shock absorbing elements.

The expandable/retractable shock absorbing elements preferably comprise an air cushion suspension system positioned between the first and second frame supports. For transporting the highly sensitive equipment in a truck van, the portable cart frame includes extensible/retractable arms for engagement with corresponding floor supports provided on a truck van floor surface.

Preferably, there are three floor supports arranged in a triangular pattern mounted on the truck van floor surface and three extensible/retractable arms on the portable cart for three point engagement of the portable cart with the truck van floor surface when the portable cart and highly sensitive equipment are transported between various locations.

The three floor supports are preferably vertically mounted plates with openings for receiving the extensible/retractable arms for securing the portable cart to the truck van floor surface. The extensible/retractable arms include manually extensible/retractable arms. The manually extensible/retractable arms preferably extend from opposite sides of the portable cart for engaging oppositely positioned floor supports on the truck van floor surface. The extensible/retractable arms include a power activated extensible/retractable arm for engaging at least one floor support. The power activated extensible/retractable arm is positioned within an opening of the floor support that is triangularly offset from the oppositely positioned floor supports.

These and other objects and advantages of the present invention will become apparent from the description that follows.

BRIEF DESCRIPTION OF THE SEVERAL VIEWS OF THE DRAWINGS

In the drawings.

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

As explained above, the portable cart of the present invention is designed for use with excimer laser or other highly sensitive equipment that provides two different aspects. First of all, the portable cart must be securely retained within a truck van such that the air cushion suspension system of the truck van to protect the excimer laser or other highly sensitive equipment during transportation. Secondly, the portable cart of the present invention has its own air cushion suspension system such that it is possible for a user to readily move the laser cart with the highly sensitive equipment from the truck van to a doctor's office or clinic where it is subsequently fixedly mounted in the desired location. These two different aspects of the present invention will become apparent from the description that follows.

Figure 1:
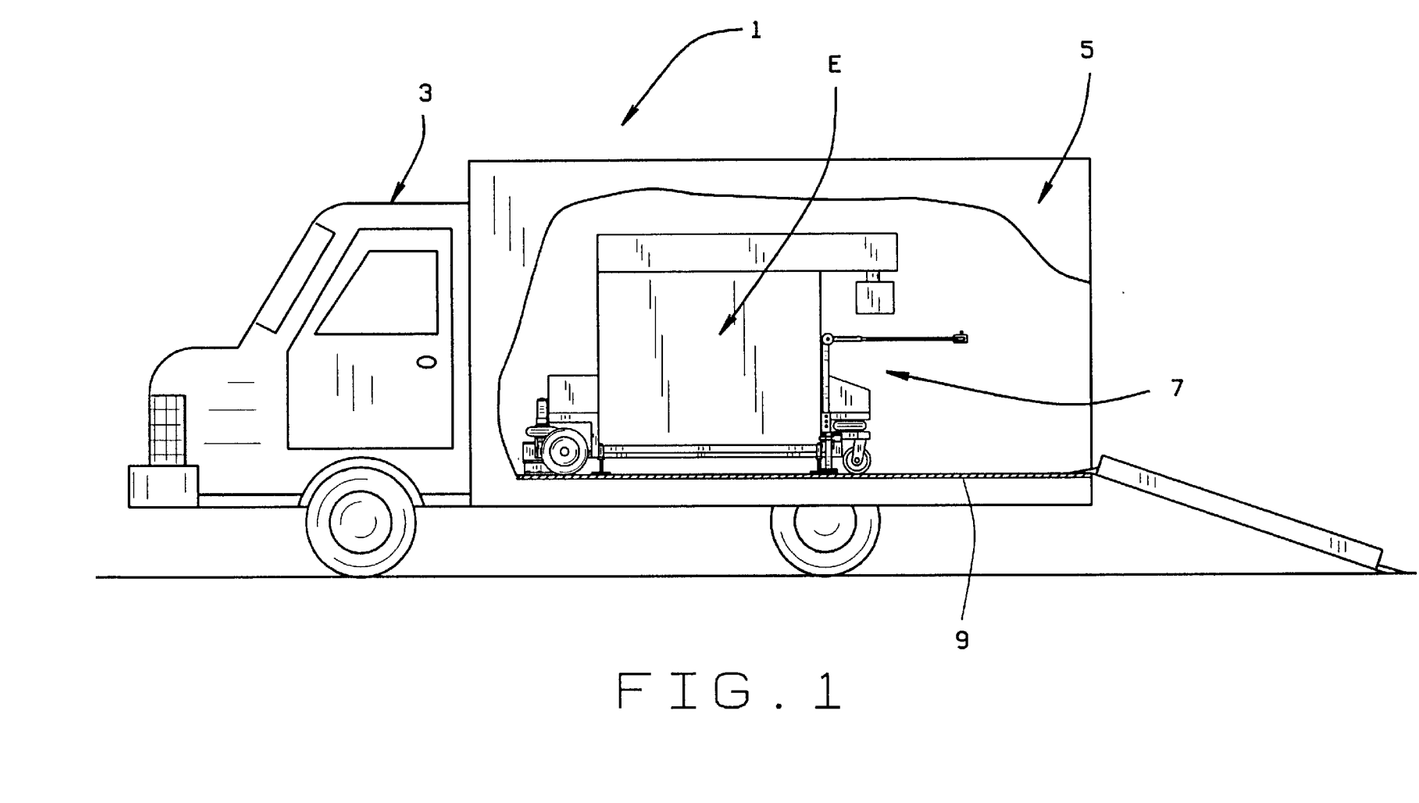
FIG. 1 is a side elevational view, partly in section, of a truck van with the portable cart supporting highly sensitive equipment secured to the floor within the truck van.
Figure 2:
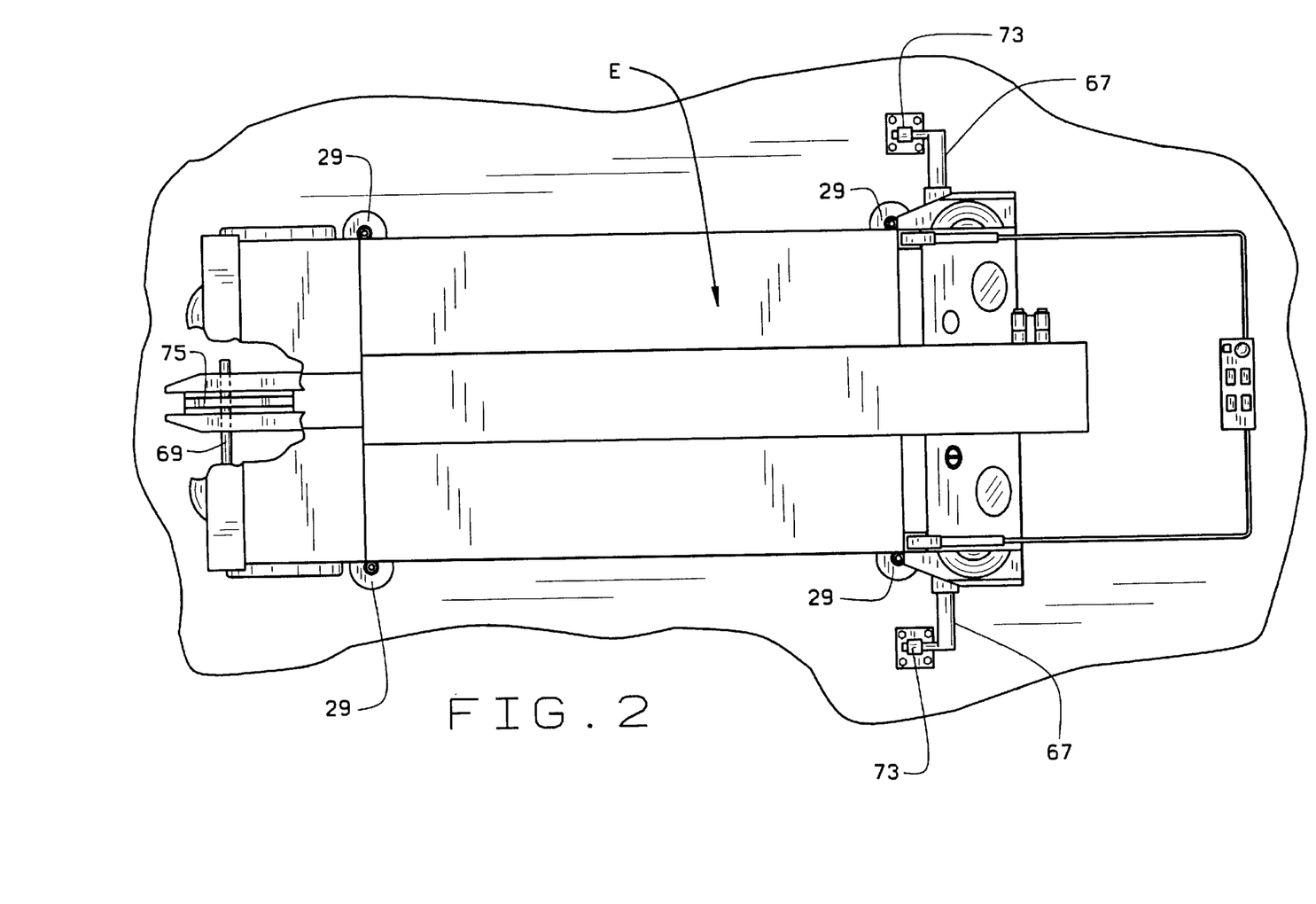
FIG. 2 is a fragmentary top plan view of the truck van illustrated in FIG. 1 with a specific illustration of three point engagement/support of the portable cart containing highly sensitive equipment to the floor of the truck van.

As illustrated in FIG. 1 of the drawings, a moving van 1 includes a truck cap section 3 and a moving van section 5. Within the moving van section 5, the portable cart or highly sensitive equipment 7 is securely mounted to the floor 9 of the truck van 5 in order to allow the air cushion suspension system of the truck van 1 to provide an air cushion shock absorbing ride during the transportation of the portable cart with highly sensitive equipment 7 from one location to another.

Figure 12:
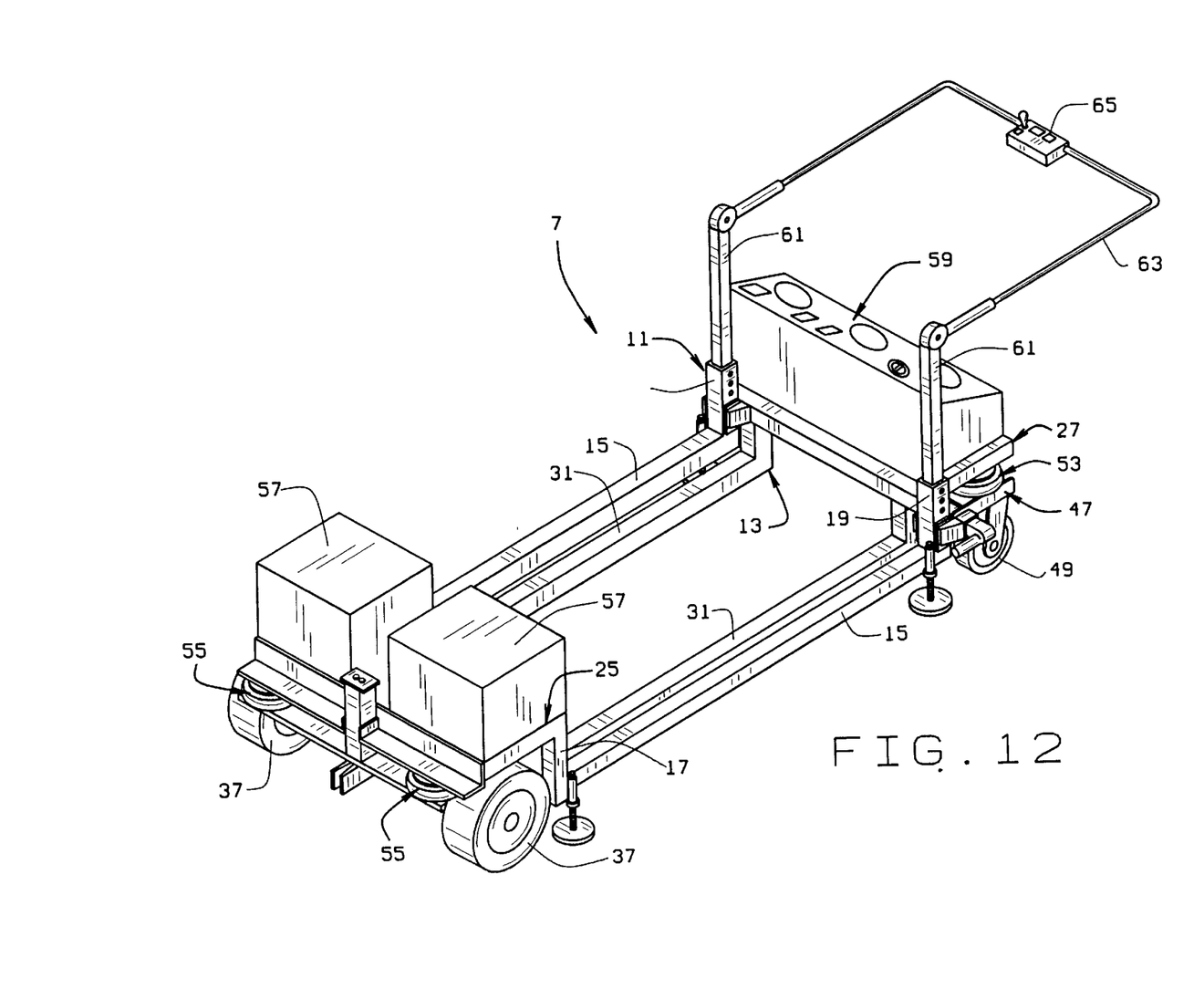
FIG. 12 is a perspective view of the portable cart by itself without any highly sensitive equipment.
Figure 13:
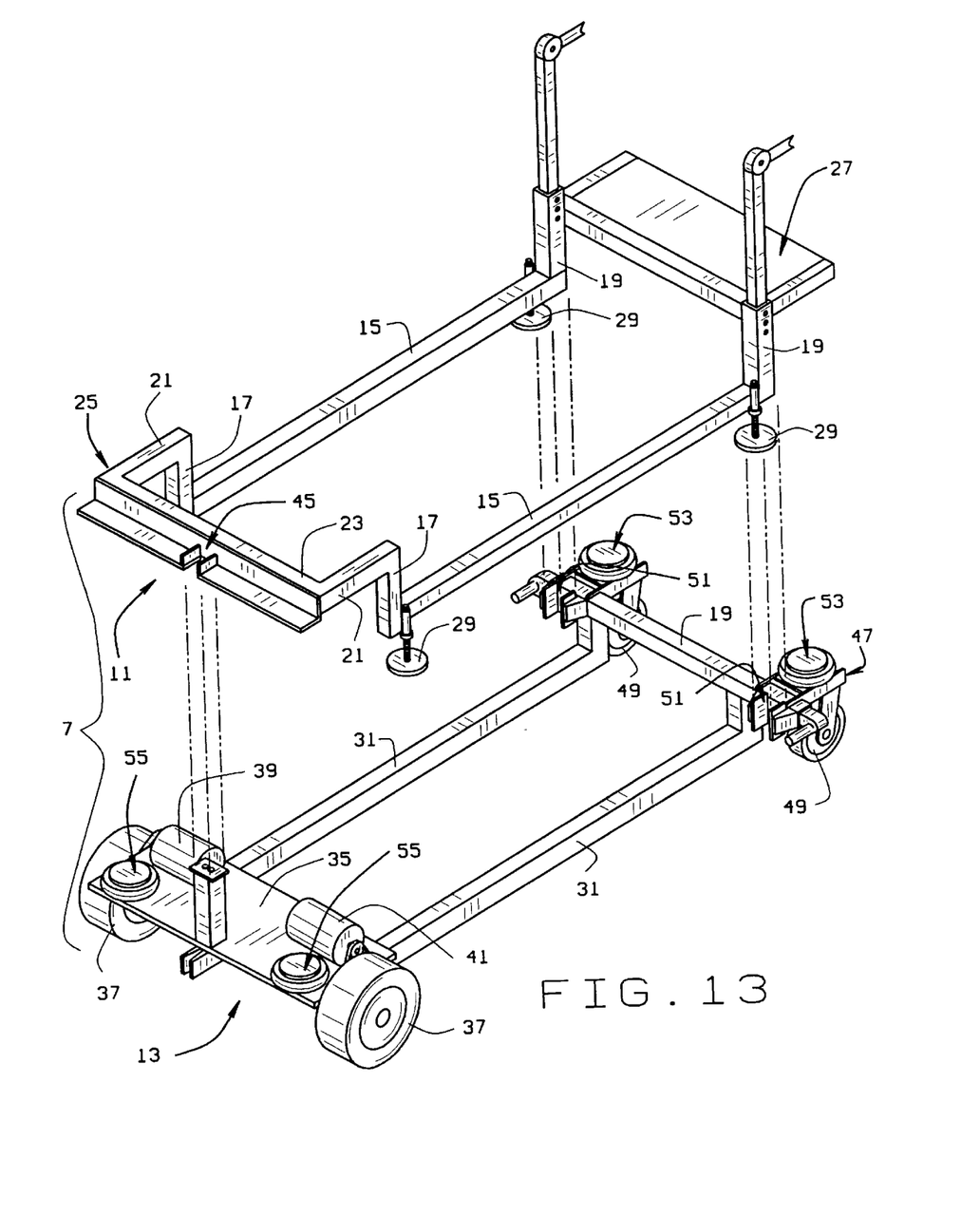
FIG. 13 is an exploded perspective view of the various components forming the first and second frame supports of the portable cart of the present invention.

In order to understand how the portable cart 7 is secured within the truck van 5, while at the same time permitting independent air cushion suspension of the highly sensitive equipment on the portable art 7, reference is first made to FIGS. 12 and 13 of the drawings for an illustration and description of the various components of the portable cart 7 itself. As best seen in FIG. 13 of the drawings, the portable cart 7 includes a first or upper frame 11 and a second or lower frame 13. The first frame 11 is in the nature of a sub-frame which supports the laser or highly sensitive equipment E, while the lower frame 13 is in the nature of a main frame that supports the sub-frame 11.

Specifically, the first or upper frame 11 includes a pair of spaced horizontally directed elongated rods 15 that are each connected at one end to vertically directed rod shafts 17 and at an opposite end to vertically directed rod shafts 19. As illustrated in the drawings, all of the elongated rods and rod shafts are shown to be polygonally shaped, specifically square shaped, in order to readily accommodate the equipment E. The spaced vertically extending rod shafts 17, 17 extend upwardly for a greater distance than the spaced rod shafts 19, 19 and are connected to spaced horizontally directed rod supports 21 that are, in turn, connected to a rod end section 23 in order to form a U-shaped supporting platform 25. At an opposite end, the smaller in height rod shafts 19, 19 are connected at an upper end to the horizontally directed platform section 27. Both the U-shaped platform 25 and the platform section 27 are arranged to support various components such as batteries, motors, and controls, as will be subsequently described. Extending downwardly from each supporting rod 15 are a pair of spaced supporting feet 29, 29. As will become apparent, these supporting feet 29 are used in supporting the highly sensitive equipment E at a fixed location, as will become apparent. The equipment E is cradled within the area defined by the spaced supporting rods 15, 15 and the vertically directed spaced shaft sections 17, 17 and 19, 19 as can be seen, for example, in FIGS. 7–9 of the drawings.

The second or lower frame 13 includes a pair of spaced supporting rods 31, 31 that are spaced apart a shorter distance from one another than the spaced supporting rods 15, 15 of the first or upper frame 11 in order to allow the rod supports 31, 31 of the second or lower frame 13 to be received within the spaced rod supports 15, 15 of the first or upper frame support 11, as shown in FIG. 12 of the drawings. At one end of the spaced supporting rods 31, 31 are spaced supporting plates 33, 33 which are integrally connected to a horizontally directed plate 35. The spaced vertically directed plates 33, 33 support the pair of wheels 37, 37 to an axle that extends through the spaced supporting plates 35, 35, motors 39 mounted on top of the horizontally directed plates 35, through a suitable belt 41, drive the spaced wheels 37, 37 of the second or lower supporting frame 13. Also extending upwardly from the horizontally directed plates is a vertical shaft 43 which is received within a U-shaped guide 45 attached to the U-shaped element 25 of the first or upper frame 11, for reasons to be subsequently discussed.

At the opposite end of the second or lower frame 13 are a spaced pair of upwardly directed rods 45 that are connected to a horizontally directed U-shaped supporting element 47. A pair of spaced casters 49, 49 extend downwardly from the U-shaped supporting element 47 for cooperation with the spaced pair of driving wheels 37, 37 at the opposite end of the lower second frame 13. A spaced pair of U-shaped guide elements 51, 51 are also attached to the U-shaped supporting element 47 and receive the spaced vertically extending spaced rods 19, 19 of the first or upper supporting frame 11, in cooperation with the shaft 43 on the second or lower supporting frame 13 which is slidingly received within the U-shaped guide 45 of the first or upper frame 11. As a result, the first or upper frame 11 is vertically movable relative to the second or lower frame 13 in order to provide for fixed or rolling movement of the portable cart 7.

As shown in FIG. 13 of the drawings, spaced air cushion elements 53, 53 are mounted on spaced legs of the U-shaped element 47 at one end of the second or lower frame 13 while spaced air cushion elements 55, 55 are mounted on the horizontally directed supporting plate 35 at the opposite end. The spaced pairs of air cushion elements 53, 53 and 55, 55 supported at opposite ends of the second or lower frame 13 or positioned between the first or upper frame 11 and the second or lower frame 13. Specifically, it will be seen that the spaced pair of air cushion elements 53, 53 are positioned between the U-shaped element 47 of the second or lower frame 13 and the horizontally directed supporting plate 27 of the first or upper supporting frame 11. At an opposite end of the portable cart 7, the spaced pair of air cushion elements 55 are positioned between the horizontally directed supporting plate 35 of the second or lower supporting frame 13 while being overlayed by the U-shaped element 25 of the first or upper supporting frame 11 in contacting relationship.

The portable cart 7 includes batteries and control electronics 57 mounted on top of the U-shaped supporting element 25 of the first or upper supporting frame 11 while the horizontally directed supporting plate 27 at the opposite end of the first or upper supporting frame 11 supports controls, the compressor tank, the charger, the reel, junction boxes, and other control components generally designated 59.

Extending upwardly from the horizontally directed supporting plate 27 are a spare pair of vertically directed supporting arms 61, 61 which support the U-shaped handle 63 for guiding the portable cart. Suitable control 65 may be provided in the U-shaped handle 63 for operating the portable cart 7.

Figure 10:
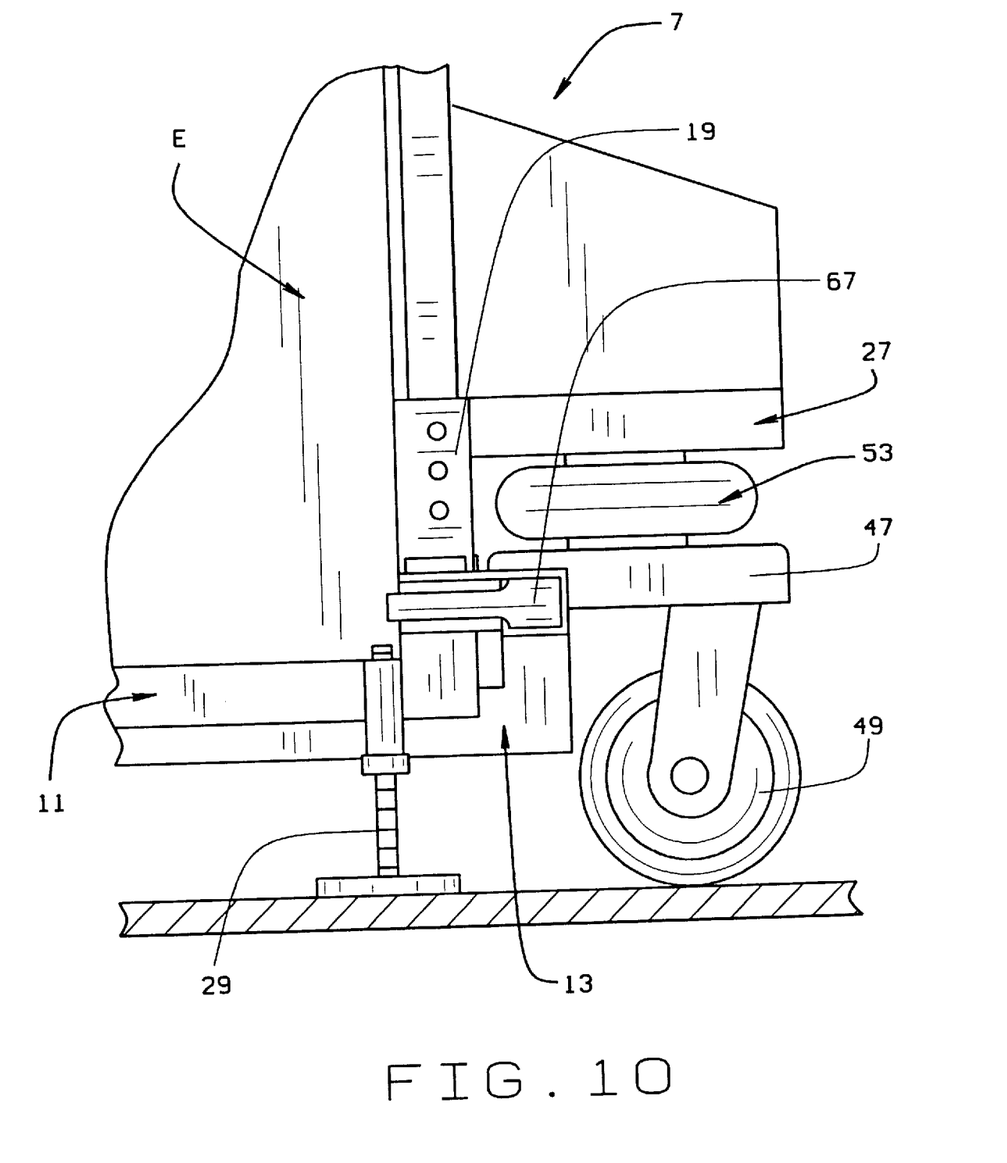
FIG. 10 is an enlarged fragmentary side elevational view of a rear portion of the portable cart for highly sensitive equipment.
Figure 11:
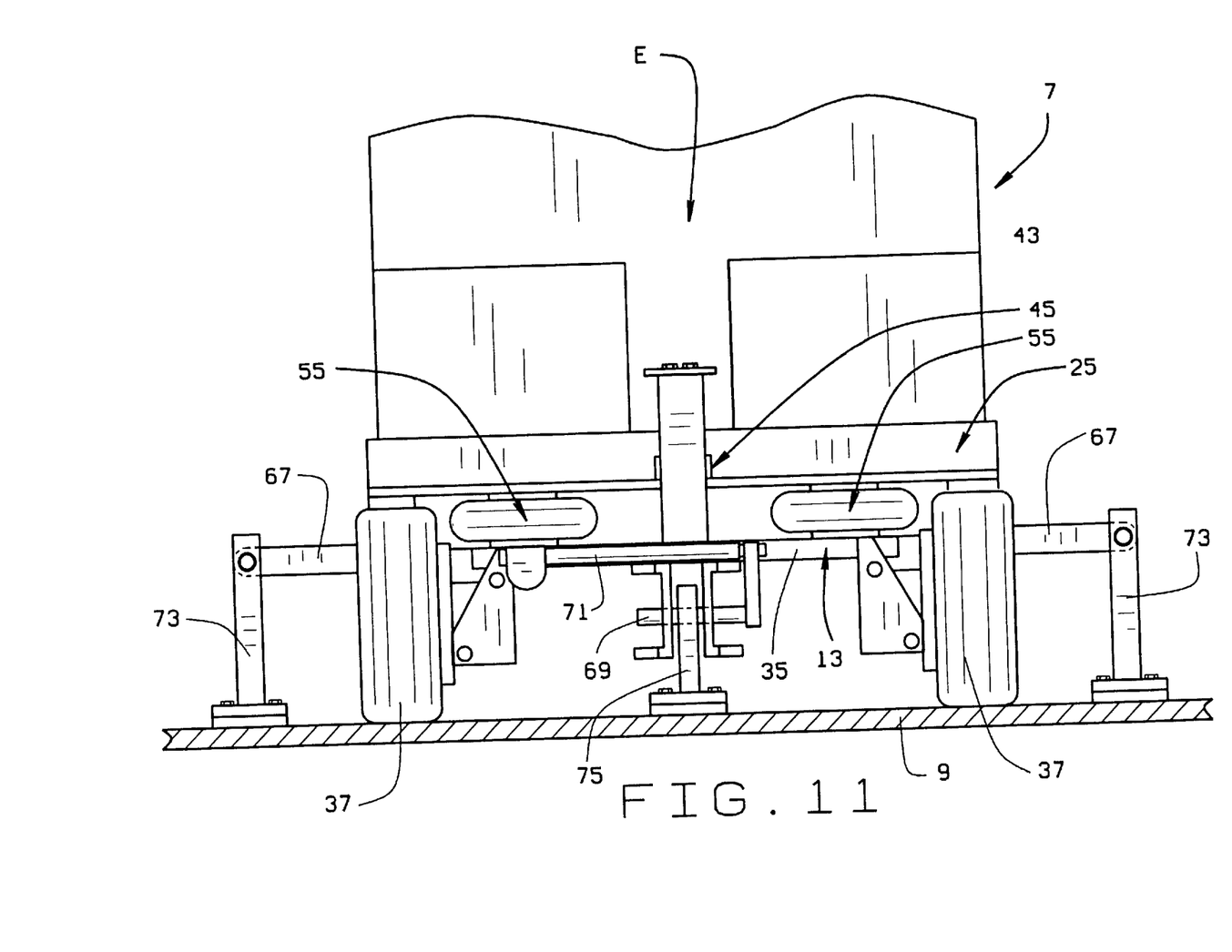
FIG. 11 is a fragmentary enlarged end elevational view further depicting the various components of the portable cart for highly sensitive equipment.

As best seen in FIGS. 10–11 of the drawings, the portable cart also includes extensible/retractable arms for securing the portable cart in the moving van. Specifically, as shown in FIG. 10, the pair of manually extensible/retractable arms 67, 67 are provided on opposite sides of the portable cart 7 in the vicinity of the U-shaped supporting element 47. As will be discussed further below, the manually extensible/retractable supporting arms 67, 67 are capable of being positioned in a retracted position generally within the confines of the portable cart 7. At an opposite end of the portable cart 7 is a power activated extensible/retractable arm 69 that is activated/de-activated by the motor 71 that is supported by the second or lower frame 13. The power activated extensible/retractable arm 69, like the manually extensible/retractable supporting arm 67, 67 are shown in FIG. 11 of the drawings as being engaged by the lower supports in the truck van.

Figure 3:
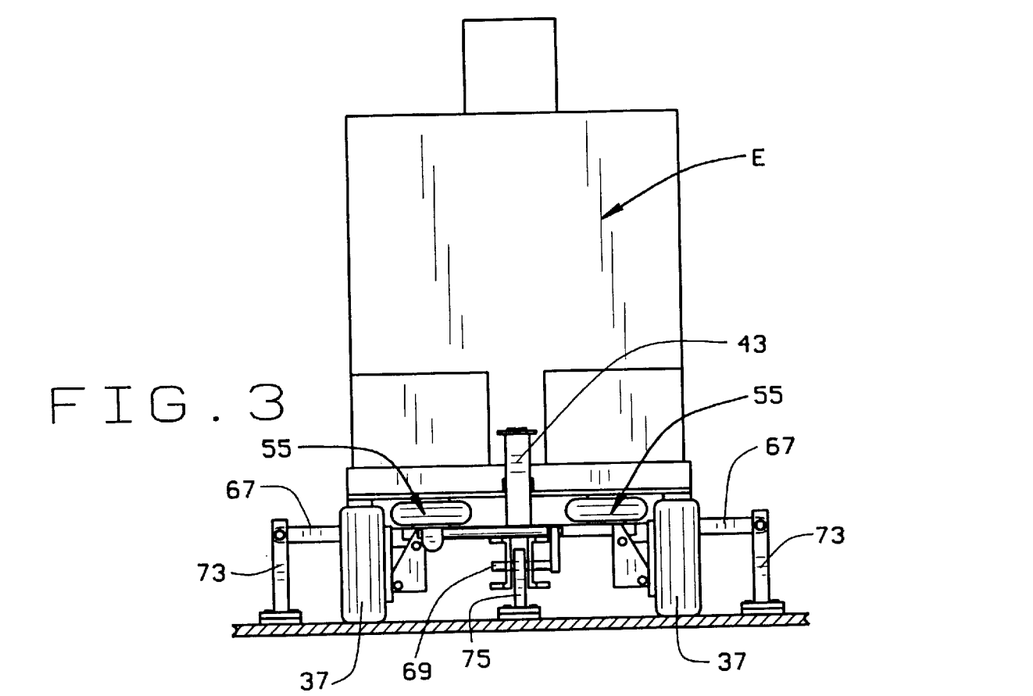
FIG. 3 is an end elevational view, partly in section, further illustrating the manner in which the portable cart containing highly sensitive equipment is mounted to the floor of the truck van.
Figure 4:
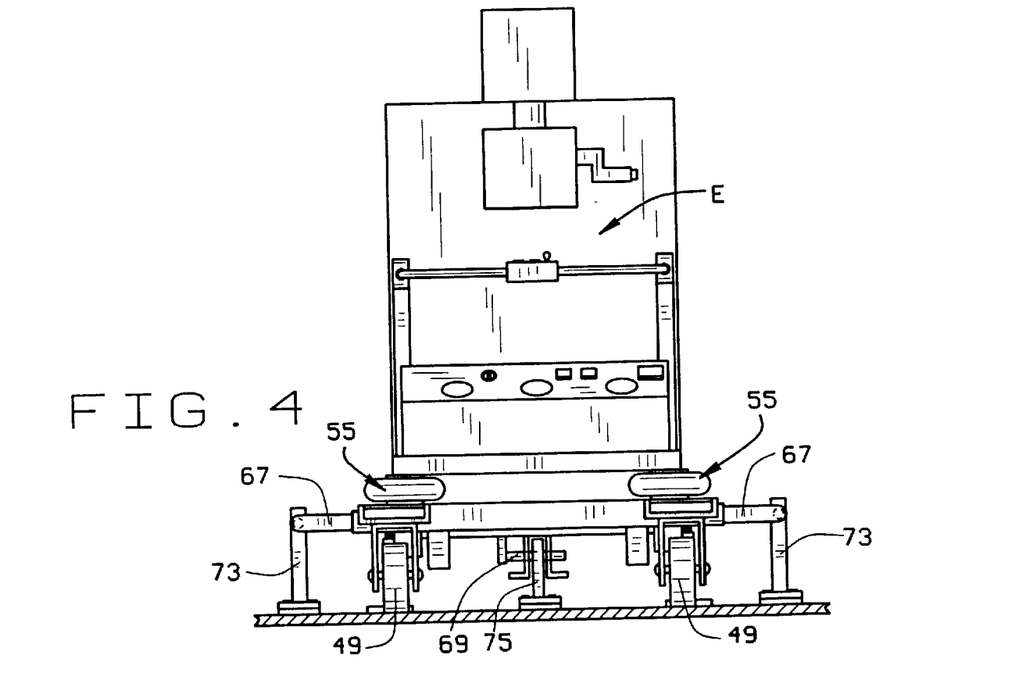
FIG. 4 is an end elevational view, partly in section, as viewed from an end opposite to that illustrated in FIG. 3 and also illustrated in the manner in which the portable cart containing highly sensitive equipment is mounted to the floor of the truck van.

As shown in FIGS. 2–4 and 11 of the drawings, there are three floor supports 73, 73 and 75 comprising vertically mounted plates with openings for receiving the extensible/retractable arms 67, 67 and 69 for securing the portable cart 7 to the truck van floor surface 9. The manually extensible/retractable arm 67, 67 extends from opposite ends of the portable cart, as shown in FIGS. 3–4 and 11, and engage oppositely positioned floor supports 73, 73 on the truck van floor surface 9. The power activated extensible/retractable arm 69 engages the floor support 75 arranged in a triangular pattern with respect to the oppositely positioned floor support 73, 73. Thus, there is a three point engagement of the portable cart 7 with the floor supports within the truck van 5, with the power activated extensible/retractable arm preventing any movement of the portable cart 7 relative to the truck van floor surface 9. In this way, the air cushion suspension system of the truck van 5 provides a shock-absorbing support for the equipment E mounted on the portable cart 7 during the movement of the truck 1 from location to location.

Figure 5:
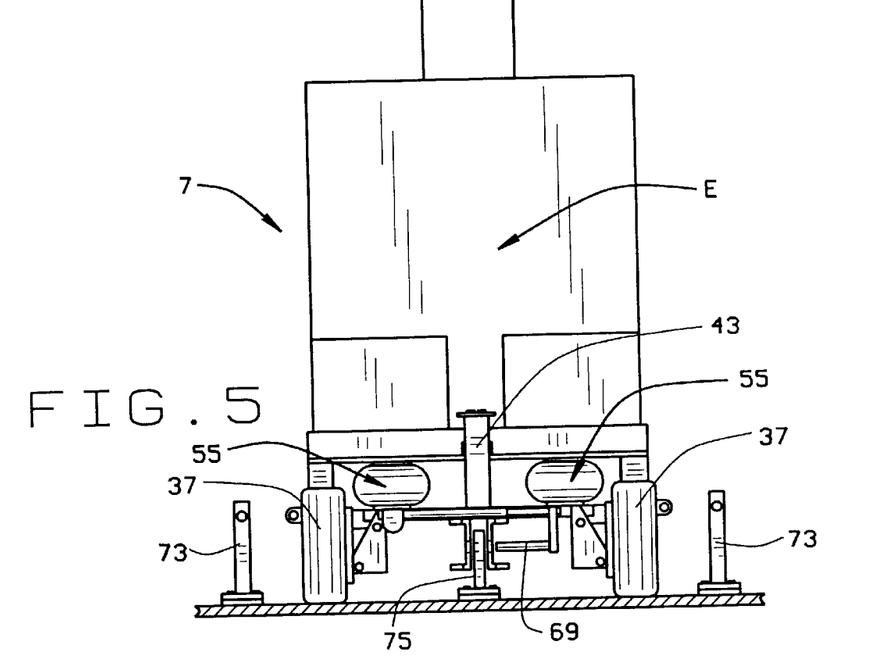
FIG. 5 is an end elevational view, partly in section, of the portable cart containing highly sensitive equipment illustrating detachment from the floor of the truck van for independent movement of the portable cart with highly sensitive equipment.
Figure 6:
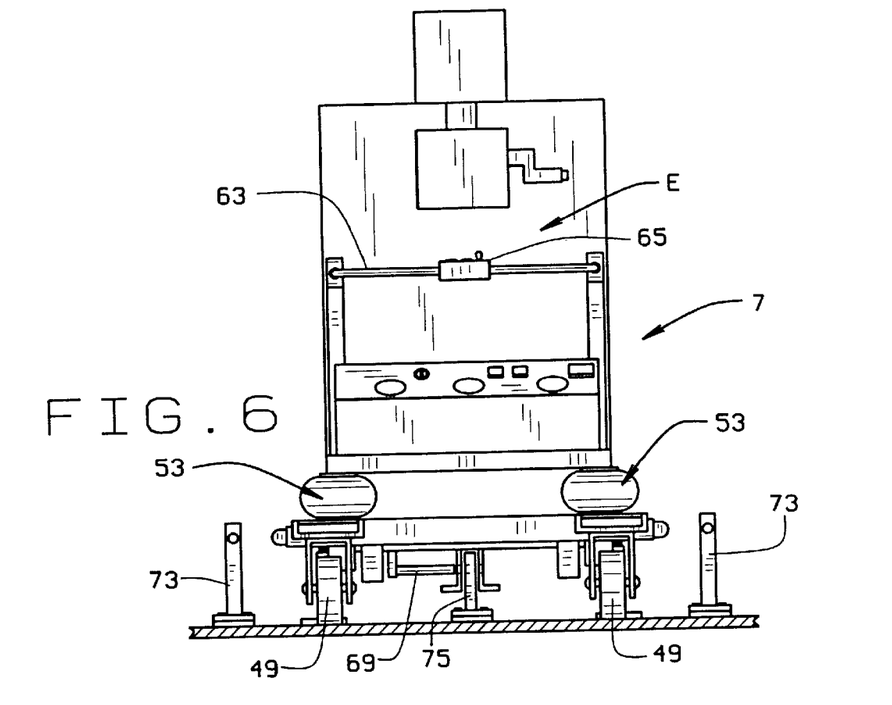
FIG. 6 is an end elevational view, partly in section, at an end opposite to that illustrated in FIG. 5 and also depicting the manner in which the portable cart with highly sensitive equipment is detached from the floor of the truck van.

When the truck reaches its desired location, typically a doctor's office or clinic, the power activated extensible/retractable arm 69 is de-activated, while the manually extensible/retractable arms are disengaged from the floor supports 73, 73 and move back generally within the confines of the portable cart 7, as shown in FIGS. 5–6 of the drawings. However, prior to this time, the expandable/retractable shock absorbing elements in the form of the spaced air cushions 53, 53 and 55, 55 are energized from the collapsed positioned illustrated in FIGS. 3–4 to the expanded position illustrated in FIG. 5–6. This results from the user operating the control 65 on the U-shaped handle 63 that energizes the controls, motors and compressor tank, generally identified at 57, 59 for expanding the air cushion elements 53, 53 and 55, 55.

Figure 7:
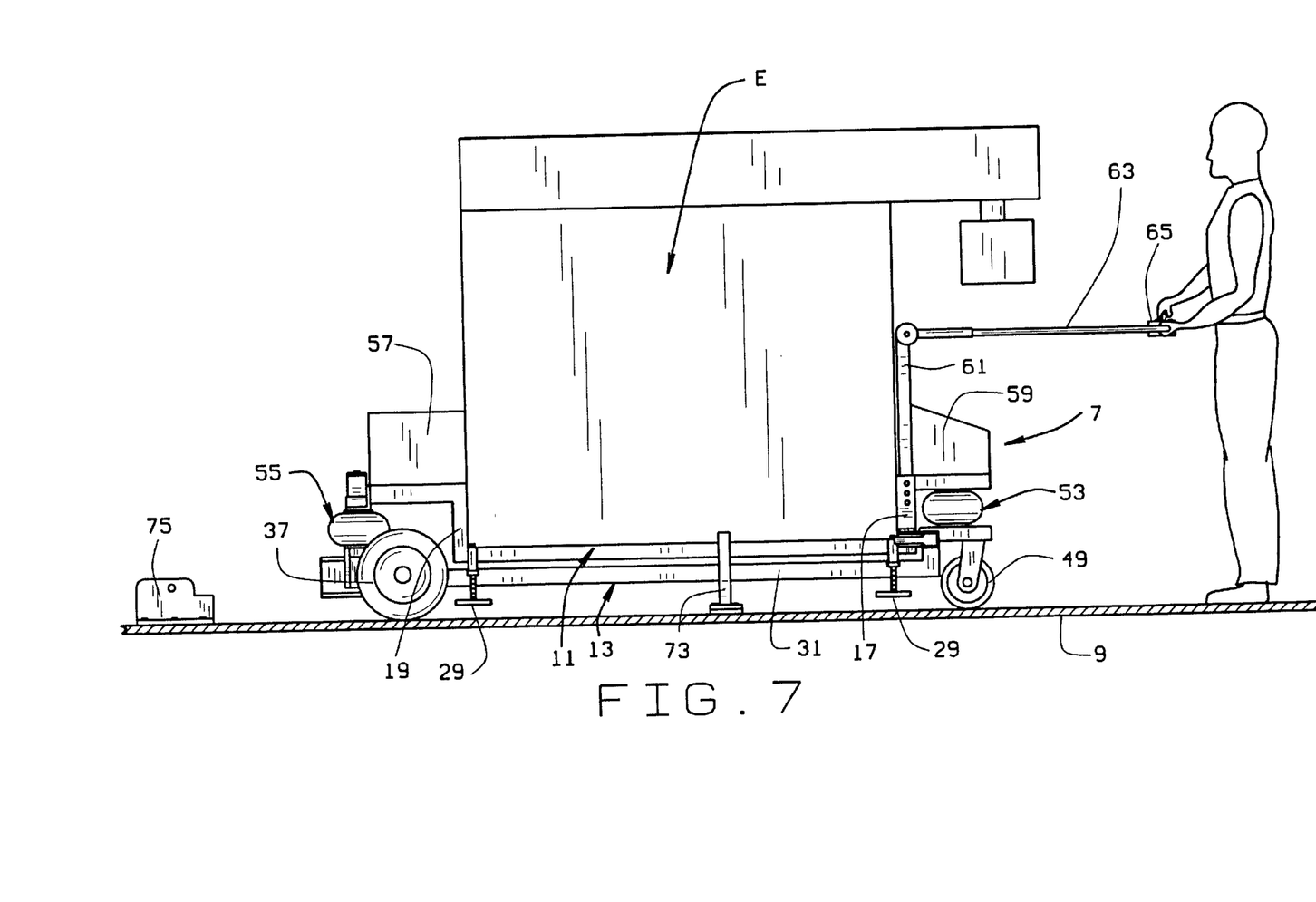
FIG. 7 is a side elevational view, partly in section, illustrating a user moving the portable cart from the truck van.
Figure 8:
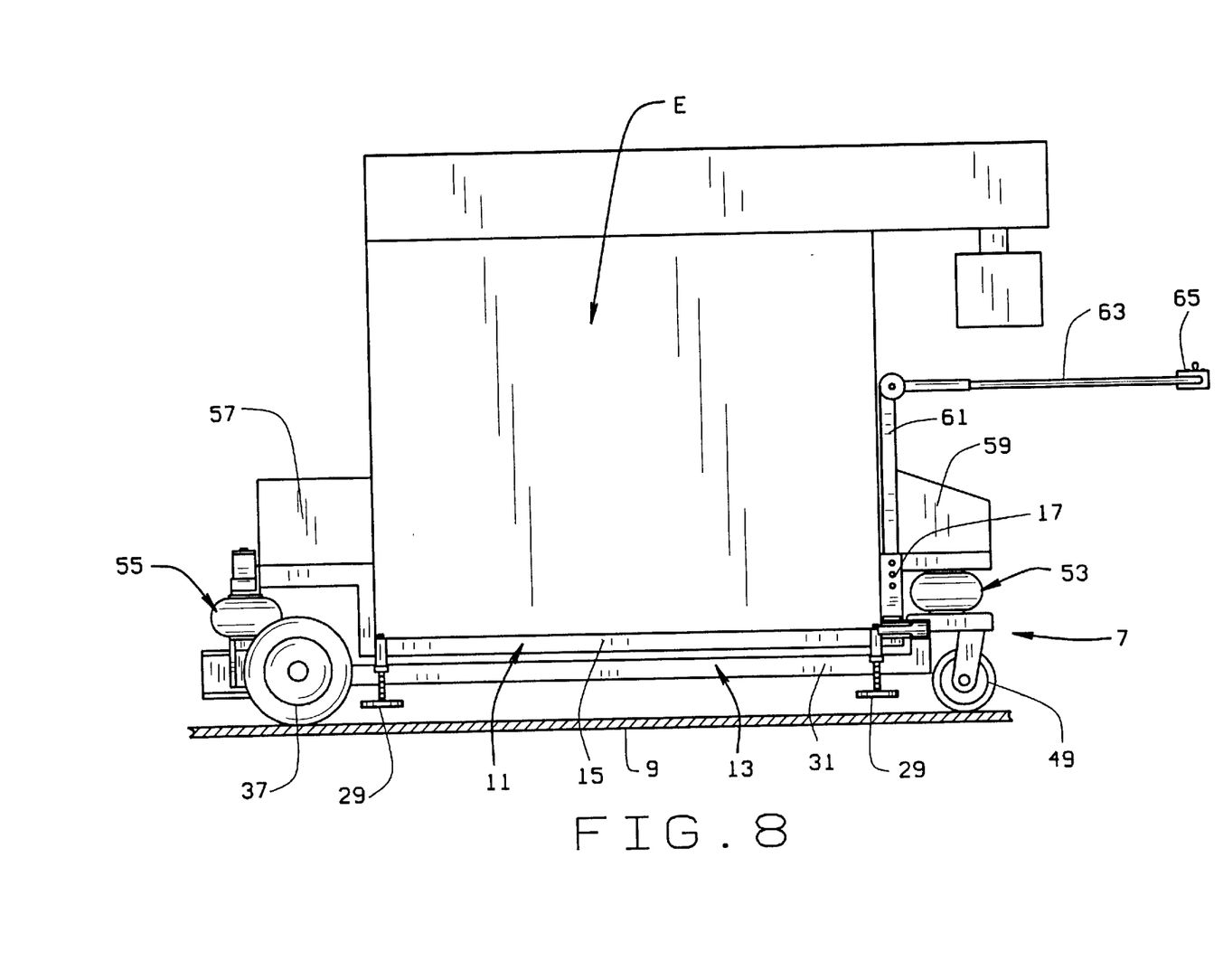
FIG. 8 is a side elevational view, similar to FIG. 7 and further illustrating how the cart is used to provide a shock absorbing ride for the highly sensitive equipment.

As shown in FIGS. 7–8 of the drawings, when the expandable/retractable shock absorbing elements in the form of the air cushion suspension elements 53, 53 and 55, 55 are expanded as shown in FIG. 7–8 of the drawings, the first or upper frame 11 including the spaced feet 29 are lifted above the truck van floor surface 9 in order to enable the wheels 37, 37 and casters 49, 49 of the second or lower frame 13 to engage the truck van floor surface 9 in rolling shock absorbing movement of the equipment E. As will be appreciated, the air cushion suspension elements 53, 53 and 55, 55 suspend the equipment E supported by the first or upper frame 11 from the second or lower frame 13, including the rolling contact with the wheels 37, 37 and casters 49, 49 from a floor surface. As a result, the highly sensitive equipment E is protected during its movement from the truck van 1 to a doctor's office or clinic, for example.

Figure 9:
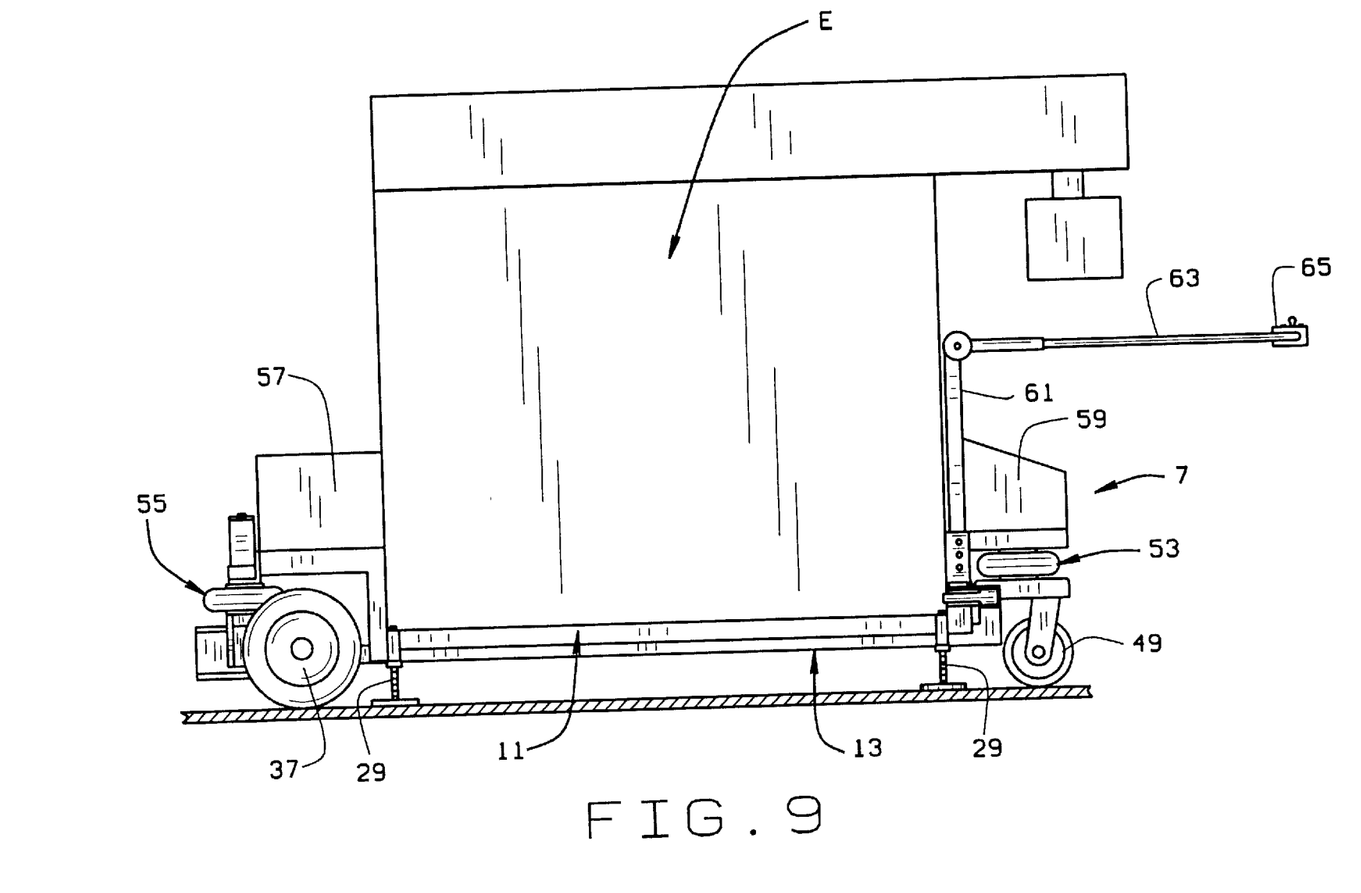
FIG. 9 is a side elevational view, partly in section, of the portable cart with highly sensitive equipment when the portable cart is positioned in a fixed location, following movement.

When the desired location is reached in a doctor's office or clinic, for example, the control 65 on the U-shaped handle 63 are again operated to de-activate the expandable/retractable shock absorbing elements in the form of the air cushion suspension elements 53, 53 and 55, 55. This causes the air cushion suspension elements 53, 53 and 55, 55 to collapse or retract to enable the first or upper frame 11 to be lowered which, in turn, causes the spaced feet 29 to engage a floor surface 77 in a doctor's office or clinic. Thus, the highly sensitive equipment E can be precisely located in a doctor's office or clinic, for example, without damage to the equipment E.

From the foregoing, it will be appreciated that the portable cart 7 can be readily secured in the truck van in order to allow the highly sensitive equipment mounted on the portable cart to be protected by the air cushion suspension system of the truck van. When it is desired to remove the portable cart with the highly sensitive equipment, the air cushion suspension system of the portable cart then protects the equipment from any damage or misalignment as the result of the expandable/retractable shock absorbing system built into the portable cart. For positioning the highly sensitive equipment in the desired location, the air cushion suspension system of the portable cart is de-activated in order to fixedly position the highly sensitive equipment at the desired location. Thus, a highly versatile, cost effective, durable and easy-to-operate the portable cart air cushion suspension system, along with the ability to secure the portable cart in a truck van, has been developed.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

I claim:

1. A portable cart for transporting highly sensitive equipment comprising:

a first fixed frame support for fixed support of the equipment on a floor surface;

a second rolling frame support for rolling movement of the equipment on said floor surface, said second rolling frame support being movable relative to the first fixed frame support; and a plurality inflatable pneumatic shock absorbing elements positioned between the first and second frame supports for lifting the first frame support off said floor surface while enabling the second frame support including rollers to provide rolling movement on said floor surface when said inflatable pneumatic shock absorbing elements are expanded, the first frame support being lowered for fixed support on said floor surface when said inflatable pneumatic shock absorbing elements are retracted for fixed support of the equipment on said floor surface.

2. A portable cart for transporting highly sensitive equipment, comprising:

a first frame support including spaced feet for supporting the equipment on a floor surface;

a second frame support including rollers for rolling movement of the equipment;

the first frame support being vertically movable relative to the second frame support; and a plurality of inflatable pneumatic shock absorbing elements positioned between the first and second frame supports, said shock absorbing elements when inflated lifting the first frame support above said floor surface while enabling the rollers of the second frame support to engage said floor surface for rolling/shock absorbing movement of the equipment, said shock absorbing elements when deflated lowering the first frame support to cause a plurality of spaced feet to engage said floor surface for fixed support of the equipment on said floor surface.

3. The portable cart as defined in claim 2 in which the first and second frame supports include complementary male and female elements for vertical movement of the first frame support relative to the second frame support.

4. The portable cart as defined in claim 3 in which the first frame support includes shaft sections slidably received within corresponding guides provided in the second frame support, for vertical motion of said shaft sections relative to said guides.

5. The portable cart as defined in claim 2 including user control means for activating/de-activating said inflatable pneumatic shock absorbing elements.

6. The portable cart as defined in claim 5 in which the user control means includes a user switch that energizes motor means to activate/de-activate said inflatable pneumatic shock absorbing elements.

7. The portable cart as defined in claim 2 in which the inflatable pneumatic shock absorbing elements comprise an air cushion suspension system.

8. A portable cart for transporting highly sensitive equipment, comprising:

a first frame support including spaced feet for supporting the equipment on a floor surface;

a second frame support including rollers for rolling movement of the equipment;

the first frame support being vertically movable relative to the second frame support; and expandable/retractable shock absorbing elements positioned between the first and second frame supports, said shock absorbing elements when expanded lifting the first frame support including spaced feet above a floor surface while enabling the rollers of the second frame support to engage a floor surface for rolling/shock absorbing movement of the equipment, said shock absorbing elements when retracted lowering the first frame support to cause the spaced feet to engage a floor surface for fixed support of the equipment on a floor surface; and extensible/retractable arms for engaging floor supports provided on a truck van floor surface to secure the portable cart in a fixed position for transport by a truck van.

9. A portable cart for transporting highly sensitive equipment comprising:

a first frame support including spaced feet for supporting the equipment on a floor surface;

a second frame support including rollers for rolling movement of the equipment;

the first frame support being vertically movable relative to the second frame support; and expandable/retractable shock absorbing elements positioned between the first and second frame supports, said shock absorbing elements when expanded lifting the first frame support including spaced feet above a floor surface while enabling the rollers of the second frame support to engage a floor surface for rolling/shock absorbing movement of the equipment, said shock absorbing elements when retracted lowering the first frame support to cause the spaced feet to engage a floor surface for fixed support of the equipment on a floor surface, and extensible/retractable arms for engaging floor supports provided on a truck van floor surface to secure the portable cart in a fixed position for transport by a truck van, said extensible/retractable arms include manually extensible/retractable arms.

10. A portable cart for transporting highly sensitive equipment, comprising:

a first frame support including spaced feet for supporting the equipment on a floor surface;

a second frame support including rollers for rolling movement of the equipment;

the first frame support being vertically movable relative to the second frame support; and expandable/retractable shock absorbing elements positioned between the first and second frame supports, said shock absorbing elements when expanded lifting the first frame support including spaced feet above a floor surface while enabling the rollers of the second frame support to engage a floor surface for rolling/shock absorbing movement of the equipment, said shock absorbing elements when retracted lowering the first frame support to cause the spaced feet to engage a floor surface for fixed support of the equipment on a floor surface; and extensible/retractable arms for engaging floor supports provided on a truck van floor surface to secure the portable cart in a fixed position for transport by a truck van, said extensible/retractable arms include a plurality of manually extensible/retractable arms and a power activated extensible/retractable arm.

11. A portable cart for transporting highly sensitive equipment and for fixed mounting of the cart relative to a floor surface in a truck van comprising:

three floor supports arranged in a triangular pattern and adapted for mounting on the truck van floor surface;

three extensible/retractable arms provided on the portable cart for engaging the three fixed supports when extended to secure the portable cart relative to the truck van floor surface and for disengaging the fixed supports when retracted, said extensible/retractable arms include a power activated extensible/retractable arm and manually extensible/retractable arms extending from opposite sides of the portable cart for engaging oppositely positioned floor supports adapted for mounting on the truck van floor surface.

12. A portable cart for transporting highly sensitive equipment and for fixed mounting of the cart relative to a floor surface in a truck van, comprising:

three floor supports arranged in a triangular pattern and adapted for mounting on the truck van floor surface;

three extensible/retractable arms provided on the portable cart for engaging the three fixed supports when extended to secure the portable cart relative to the truck van floor surface and for disengaging the fixed supports when retracted, said extensible/retractable arms include a power activated extensible/retractable arm and manually extensible/retractable arms extending from opposite sides of the portable cart for engaging oppositely positioned floor supports adapted for mounting on the truck van floor surface;

said power activated extensible/retractable arm positioned within an opening of a floor support that is triangularly offset from the oppositely positioned floor supports.

* * * * *